United States Patent Office 3,392,364
Patented July 9, 1968

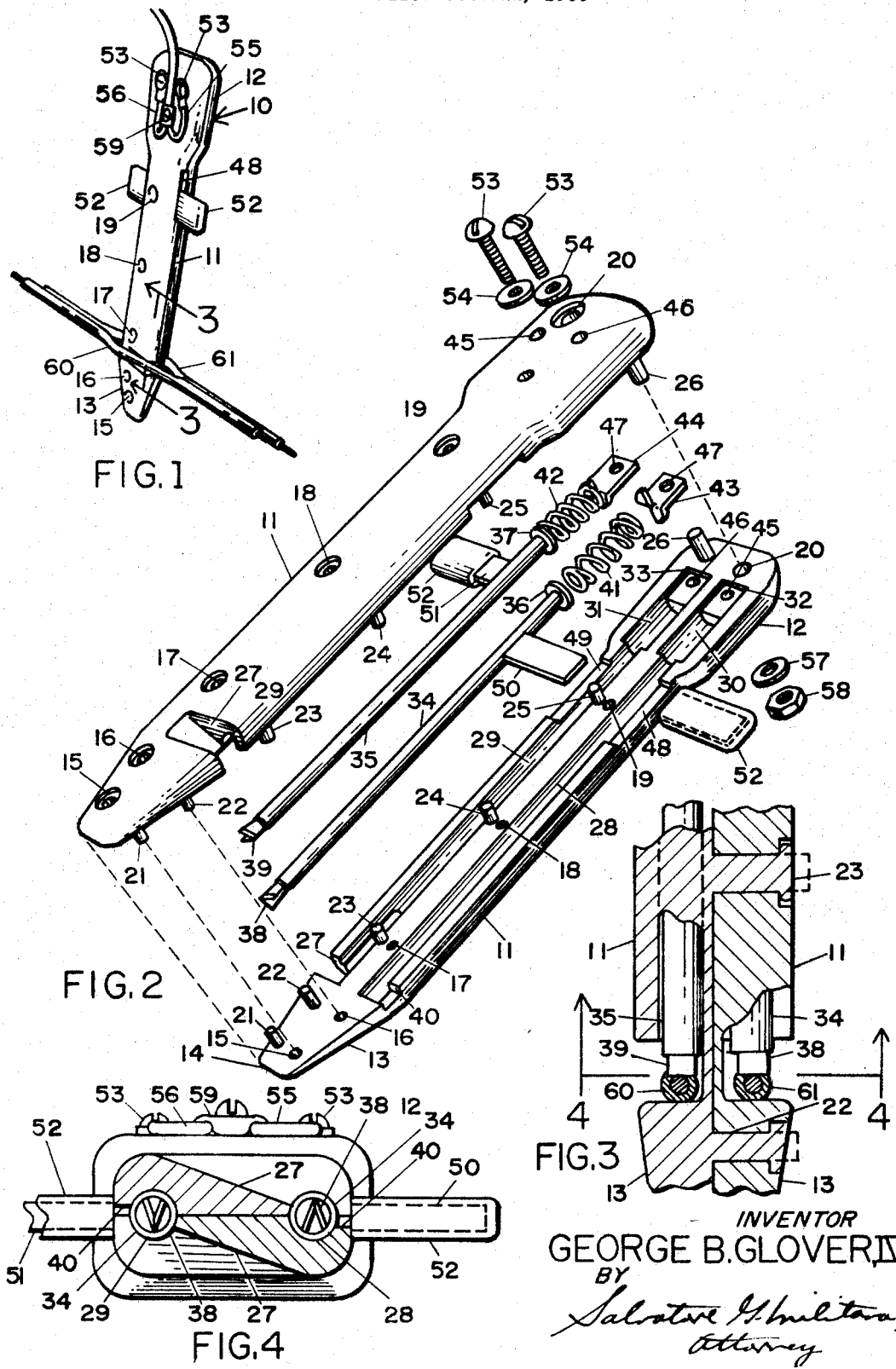

3,392,364
TAP-IN PROBE
George B. Glover IV, Hialeah, Fla., assignor to Lumidor Products Corporation, Hialeah, Fla., a corporation of Maryland
Filed Oct. 22, 1965, Ser. No. 501,820
2 Claims. (Cl. 339—98)

ABSTRACT OF THE DISCLOSURE

A tap-in probe consisting of a pair of identically constructed elongated body members, each member having a pair of longitudinal grooves and a transverse wire receiving slot communicating with one of the longitudinal grooves, a rod having a cutting blade slidably positioned in each of the grooves, a handle attached to each of the rods extending outwardly of the body members, springs urging the cutting blades away from the wire receiving slots, electrical terminals mounted on the end of the body members removed from the wire receiving slots whereby wires positioned in the slots are engaged by the cutting blades, convey electricity to the terminals.

---

This invention relates to electrical instruments and is more particularly directed to a probe for cutting through insulation and making an electrical contact with a conductor of electrical energy.

A principal object of the present invention is to provide a probe which cuts the insulation of an electrical conductor to contact the conductor without injurying the conductor.

Another object of the present invention is to provide a probe which effects an electrical connection quickly and efficiently into one or two insulated wires for the purpose of taking voltage readings, measuring for open or shorted circuits, locating a specific wire or pair of wires carrying alternating current signal or direct current voltage or pulse, checking cable or wire continuity or temporarily deferring service to another wire or pair of wires as in a telephone or communications system.

A further object of the present invention is to provide a probe for contacting a conductor that is insulated, with V-shaped cutting blades that will cut the insulation and make electrical contact with the conductor without injuring the conductor.

A still further object of the present invention is to provide an electrical wire contacting probe that is simple and compact in construction, inexpensive in cost and most effective to contact the wire for the purpose of detecting the presence or absence of electricity on the conductor.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

In the drawing:
FIGURE 1 is a perspective view of my probe showing the manner of operating same.
FIGURE 2 is an exploded view thereof.
FIGURE 3 is a longitudinal cross sectional view taken along the line 3—3 of FIGURE 1.
FIGURE 4 is a transverse cross sectional view taken along the line 4—4 of FIGURE 3.
Referring to the drawing wherein like numerals are used to designate similar parts throughout the several views, the numeral 10 refers to my tap-in probe consisting of a body member made from a pair of identically constructed members 11, 11. The pair of members 11 are injection molded of plastic and are of identical construction so that one mold will suffice for making the members 11. Each of the members 11 which forms one-half of the body portion of the probe 10 consists of a handle portion 12 at one end and the other end is tapered as at 13, terminating in a chisel-like edge 14. The inside surface is flat to receive the inside surface of another member 11 with a plurality of bores 15, 16, 17, 18, 19 and 20 formed on one side of longitudinal axis of the member 11. On the other side of the longitudinal axis of the member 11 is a plurality of posts, 21, 22, 23, 24, 25 and 26 in symmetrical relationship with the bores 15, 16, 17, 18, 19 and 20. The bores and posts are so positioned that when two identical members 11 are mounted together to form the device 10, the posts 21, 22, 23, 24, 25 and 26 of one member 11 will be received by the bores 15, 16, 17, 18, 19 and 20 of the other member 11. Then upon swedging the ends of the posts as shown by FIGURE 3, the two members 11 are locked firmly together.

On the outer surface of the member 11 at the position of the tapered end portion 13 there is a transversely disposed slot 27 which inclines downwardly in depth in the direction of the edge of the member 11. The inclined slot 27 receives the insulated wire to be probed. Longitudinally disposed slots 28 and 29 whose cross sections are semi-circular extend from the wire receiving slot 27 to the lower portion of the handle 12. Enlarged slots 30 and 31 in the handle 12 form an extension of the slots 28 and 29 and are also semi-circular in cross section. Beyond the ends of the slots 30, 31 are relatively shallow rectangular slots 32 and 33 having bores 45 and 46 extending therethrough. Slots 28, 30 and 29, 31 are so disposed about the axis of the member 11 that when two members 11 are mounted together the slots form cylindrical bores for hollow rods 34 and 35 and head portions 36 and 37 secured to the ends of the rods. At the lower extremity of the rods 34 and 35 are fitted V-shaped cutting blades 38 and 39 sharpened at their free ends. The blades 38 and 39 are normally positioned at the slot 27 which communicates with a rectangular slot 40 formed on the opposite side of an adjacent member 11, the slots 27 and 40 receiving the wires 60 and 61 as best shown by FIGURE 1.

The heads 36 and 37 which lie in slots 30 and 31 engage coil springs 41 and 42 placed therein, the other end of the coil springs 41 and 42 engaging a T-shaped stop members 43 and 44 which is provided with bores 47 which superimpose the bores 45 and 46 when the stop members 43 and 44 are placed in position in the shallow slots 32 and 33. Slots 48 and 49 which are formed in the edges of the member 11 adjacent the handle 12 communicate with the semi-circular slots 28 and 29 respectively and receive handles 50 and 51 which extend therethrough. The handles 50 and 51 are attached at their inner edges to the blade carrying rods 34 and 35 respectively. Plastic covers 52 are positioned over the handles 50 and 51 to prevent the operator of the probe 10 from feeling the electrical current present in the wires 60 and 61, since the cutters 38, 39, rods 34, 35, heads 36, 37, coil springs 41, 42 and spring stop members 43, 44 are all metallic and conductors of electricity. Bolts 53 with their washers 54 which form terminals for the wires 55 and 56 are received by the bores 45, 46 of the members 11 and fastened on the handle 12 by means of a washer 57 and nut 58. Since the bolts 53 engage and contact the spring stop members 43 and 44, electric current will travel from the cutting blades 38, 39 as described hereinabove to the bolts 53 thence to the wires 55, 56 and to instruments (not shown) that may be connected to the wires 55, 56 for determining voltage, etc. A strain relieving bolt 59 fastens the wires 55, 56 to the handle 12 to prevent the wires 55 and 56 from being pulled off the terminal bolts 53.

In the normal operation of the probe 10, a person holds the handle 12 in the palm of his hand gripping the handles 50, 51 which are insulated by plastic covers 52. He then places the chisel-like edge between a pair of wires he is testing and forces the wires 60, 61 upwardly until they reach the position of the inclined slots 27. The operator then rotates the probe 10 about its axis slightly causing the wires 60 and 61 to enter the slots 27 completely and simultaneously therewith he pulls upon the handles 50, 51 against the force of the coil springs 41 and 42. The rods 34 and 35 slide upwardly in the slots 28 and 29 as the cutting blades 38 and 39 leave the position of the slot 40 as they rise into the slots 28 and 29 to permit the wires 60 and 61 to lie in the slots 40. When the handles 50 and 51 are released, the force of the coil springs 41, 42 force the rods 34 and 35 to slide downwardly and the cutting blades 38 and 39 cut through the insulation.

Now by viewing the instrument to which the wires 55, 56 have been connected the operator becomes cognizant of the electricity or lack of electricity in conjunction with the wires 60, 61 being tested.

To remove the probe 10, the handles 50, 51 are again pulled upwardly against the spring pressure to free the wires 60, 61 of the cutting blades 38, 39. The probe 10 is rotated back to its parallel position with the wires 60, 61 permitting the wires 60, 61 to remove themselves from the transverse slots 27. The probe 10 is now lifted from between the wires 60, 61 and the handles 50, 51 released. It is to be noted that this cycle of operation to obtain a reading from the wires 60, 61 with my probe 10 takes only a matter of seconds. The cut made in the insulation of the wires 60, 61 by the V-shaped blades 38, 39 are diagonal and engage the conductor thereof in lines that are disposed diagonally with relation to the axis of the wires 60, 61. Therefore, any cut made in the conductors will not open up to cause a rupture when the conductors are bent at that position as will occur if the cutting blade cut the wires 60, 61 at exactly right angle to the axis of the wires.

What I claim as new and desire to secure by Letters Patent of the United States is:

1. A tap-in probe comprising a pair of elongated body members secured together, each of said elongated body members having a longitudinally disposed axis, a chisel-shaped portion at one end and a handle portion at the other end, a groove on each side of said longitudinal axis extending between said end portions, a transverse slot for receiving a wire positioned adjacent said chisel-shaped portion communicating with one of said grooves, a rod slidably positioned in each of said grooves, a cutting blade mounted on the end of each of said rods extending across said transverse slots, said body member having slotted portions extending to said longitudinal grooves, handle means connected to said rods and extending through said slotted portions for sliding movement of said rods in a direction away from said transverse grooves, spring means mounted in said grooves at the other end of said rods yieldingly maintaining said cutting blades in said transverse slots, and electrical terminal means mounted on said handle portion of said body members and connected to said spring means whereby upon cutting into wires positioned at said transverse slots, said blades engage the wires and conduct electricity from said wires through said rods and said springs means to said electrical terminal means.

2. A tap-in probe comprising a pair of elongated body members secured together, each of said elongated body members having a longitudinally disposed axis, a chisel-shaped portion at one end and a handle portion at the other end, a groove on each side of said longitudinal axis extending between said end portions, said grooves having a substantially semi-circular cross section, a transverse slot for receiving a wire positioned adjacent said chisel-shaped portion communicating with one of said grooves, said transverse slot being inclined and having its greatest depth at said one of said grooves, a rod slidably positioned in each of said grooves, a cutting blade mounted on the end of each of said rods extending across said transverse grooves, said body member having slotted portions extending to said longitudinal grooves, handle means connected to said rods and extending through said slotted portions for sliding movement of said rods in a direction away from said transverse slots, springs means mounted in said grooves at the other end of said rods yieldingly maintaining said cutting blades in said transverse slots, electrical terminal means mounted on said handle portion of said body members and connected to said spring means whereby upon cutting into wires positioned at said transverse grooves, said blades engage the wires and conduct electricity from said wires through said rods and said spring means to said electrical terminal means, each of said body members having a post and a mating opening positioned symmetrically about said axis whereby upon the placing of a pair of body members together to fabricate said probe said post of one body member is received by said mating opening of the other body member to secure said body members together.

References Cited

UNITED STATES PATENTS

| | | | |
|---|---|---|---|
| 2,292,236 | 8/1942 | Martin | 339—97 |
| 2,502,860 | 4/1950 | Leithiser | 339—196 |
| 2,574,043 | 11/1951 | Lannou | 339—108 |

FOREIGN PATENTS 291,735   12/1931   Italy.

MARVIN A. CHAMPION, *Primary Examiner.*

JOSEPH H. McGLYNN, *Assistant Examiner.*